US012634827B2

(12) United States Patent
Buhari et al.

(10) Patent No.: US 12,634,827 B2
(45) Date of Patent: May 19, 2026

(54) SYSTEMS FOR AND METHODS OF A PAUSE OR RESUME PROTOCOL IN A NETWORK

(71) Applicant: Avago Technologies International Sales Pte. Limited, Singapore (SG)

(72) Inventors: Nizamudeen Buhari, Bangalore (IN); Jimut Ranjan Sahoo, Bangalore (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 548 days.

(21) Appl. No.: 18/102,943

(22) Filed: Jan. 30, 2023

(65) Prior Publication Data

US 2024/0260095 A1      Aug. 1, 2024

(51) Int. Cl.
| *H04W 52/02* | (2009.01) |
| *H04W 12/03* | (2021.01) |
| *H04W 76/10* | (2018.01) |

(52) U.S. Cl.
CPC ....... *H04W 52/0235* (2013.01); *H04W 12/03* (2021.01); *H04W 76/10* (2018.02)

(58) Field of Classification Search
CPC ............. H04W 76/10; H04W 52/0235; H04W 52/028; H04W 52/0212; H04W 12/03; Y02D 30/70
See application file for complete search history.

(56) References Cited

U.S. PATENT DOCUMENTS

| 11,483,766 B1 * | 10/2022 | Shukla | .................. | H04W 48/20 |
| 2010/0165897 A1 * | 7/2010 | Sood | ........................ | H04L 12/10 |
| | | | | 370/311 |

| 2011/0268051 A1 * | 11/2011 | Tsao | ...................... | H04W 16/14 |
| | | | | 370/329 |
| 2015/0172918 A1 * | 6/2015 | Wu | ........................ | H04W 12/50 |
| | | | | 713/168 |
| 2016/0212695 A1 * | 7/2016 | Lynch | ............... | H04W 28/0268 |
| 2017/0006526 A1 * | 1/2017 | Seok | ...................... | H04W 60/04 |
| 2017/0281060 A1 * | 10/2017 | Wedekind | .............. | G16H 40/67 |
| 2020/0178171 A1 * | 6/2020 | Lou | ........................ | H04W 76/28 |
| 2021/0127273 A1 * | 4/2021 | Ouzieli | ............ | H04W 12/0433 |
| 2021/0211945 A1 * | 7/2021 | Rugeland | .............. | H04W 76/16 |
| 2021/0315042 A1 | 10/2021 | Ouzieli et al. | | |
| 2021/0320831 A1 | 10/2021 | Park et al. | | |
| 2023/0319943 A1 * | 10/2023 | Barton | ................ | H04L 61/5092 |
| | | | | 370/338 |

FOREIGN PATENT DOCUMENTS

| CN | 114745134 A | * | 7/2022 | ........... | H04L 9/0822 |

OTHER PUBLICATIONS

Yang et al., "Method for Streaming Media Data Stream, System, Device and Computer Readable Medium", Jul. 12, 2022, CN, CN 114745134 A (Year: 2022).*

(Continued)

*Primary Examiner* — Michael K Phillips

(74) *Attorney, Agent, or Firm* — Foley & Lardner LLP

(57) ABSTRACT

Systems and methods can advantageously provide a protocol. A device using the protocol can include circuitry configured to provide at least one frame used after an access point to station association operation. The frame includes data indicating a data pause resume request or a data on indication. In some examples, the frame is provided according to an 802.11 protocol.

20 Claims, 7 Drawing Sheets

(56)        References Cited

OTHER PUBLICATIONS

European Search Report on non-Foley case related to U.S. Appl. No. 18/102,943 dtd Jun. 27, 2024.

Lounis Karim et al: "Cut It: Deauthentication Attacks on Protected Management Frames in WPA2 and WPA3", Jun. 15, 2022 (Jun. 15, 2022), 20220615, pp. 235-252, XP047 624372, [retrieved on Jun. 15, 2022] * the whole document *.

IEEE Standards Association/IEEE Computer Society: "Part 11: Wireless LAN Medium Access Control (MAC) and Physical Layer (PHY) Specifications", IEEE Std 802.11™, The Institute of Electrical and Electronics Engineers, Inc., Mar. 2012, pp. 1-2793.

IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std 802.11™, The Institute of Electrical and Electronics Engineers, Inc., Dec. 2013, pp. 1-425.

IEEE Standards Association/IEEE Computer Society: "Part 11: Wireless LAN Medium Access Control [MAC] and Physical Layer [PHY] Specifications; Amendment 5: Enhancements for Higher Throughput", IEEE Std 802.11™, The Institute of Electrical and Electronics Engineers, Inc., Oct. 2009, pp. 536.

* cited by examiner

SYSTEMS FOR AND METHODS OF A PAUSE OR RESUME PROTOCOL IN A NETWORK

FIELD OF THE DISCLOSURE

This disclosure generally relates to systems for and methods of communication between an access point (AP) and a client device (e.g., a station (STA)) or between other communication devices. In some embodiments, this disclosure generally relates to systems for and methods of data communication pause and resume operations including but not limited to pause and resume operations with security for power saving communication operations and/or off channel operations.

BACKGROUND OF THE DISCLOSURE

In the last few decades, the market for wireless communications devices has grown by orders of magnitude, fueled by the use of portable devices, and increased connectivity and data transfer between all manners of devices. Digital switching techniques have facilitated the large scale deployment of affordable, easy-to-use wireless communication networks. Furthermore, digital and radio frequency (RF) circuit fabrication improvements, as well as advances in circuit integration and other aspects have made wireless equipment smaller, cheaper, and more reliable. Wireless communication can operate in accordance with various standards such as IEEE 802.11x, Bluetooth, global system for mobile communications (GSM), code division multiple access (CDMA). As higher data throughput and other changes develop, newer standards are constantly being developed for adoption, such as a progression from IEEE 802.11n to IEEE 802.11ac.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1A:
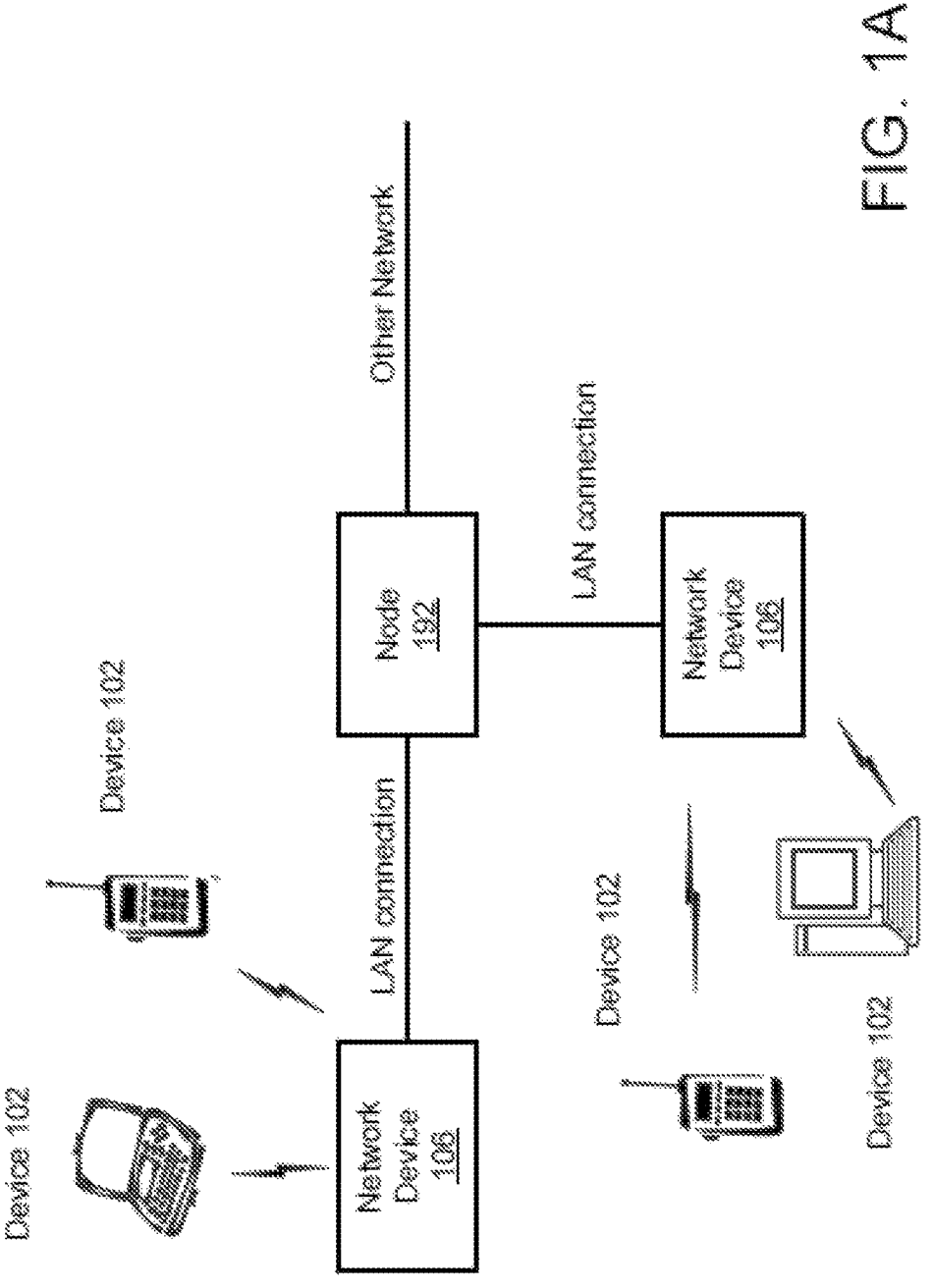
FIG. 1A is a block diagram depicting a network environment including one or more access points in communication with one or more devices or stations, according to some embodiments.

The details of various embodiments of the methods and systems are set forth in the accompanying drawings and the description below.

DETAILED DESCRIPTION

The following IEEE standard(s), including any draft versions of such standard(s), are hereby incorporated herein by reference in their entirety and are made part of the present disclosure for all purposes: WiFi Alliance standards and IEEE 802.11 standards including but not limited to IEEE 802.11a™, IEEE 802.11b™, IEEE 802.11g™, IEEE P802.11n™; and IEEE P802.11ac™ standards. Although this disclosure can reference aspects of these standard(s), the disclosure is in no way limited by these standard(s).

For purposes of reading the description of the various embodiments below, the following descriptions of the sections of the specification and their respective contents can be helpful:

Section A describes a network environment and computing environment which can be useful for practicing embodiments described herein; and Section B describes embodiments of secure pause resume operations protocols (e.g., secure power saving protocols) and methods and devices using such protocols.

Various embodiments disclosed herein are related to a protocol for pause resume operations on a network or for a point to point connections. The connections can be wireless connections to or from a client device (e.g., a STA) or AP or can be between other types of communication devices. The wireless network can be an 802.11 WiFi network in some embodiments. The client device or AP can be implemented in a device including one or more integrated circuits (ICs) packaged in an IC package.

In some embodiments, systems and methods provide a power save protocol for wireless communications that is more efficient and more secure than a conventional power save protocol (PSP) used by 802.11 networks. In some embodiments, the systems and methods prevent disturbances on data links caused by attackers manipulating unsecured null data frames to appear to be sent by a client device, thereby enhancing security. For example, when a client device is in power save mode or sleep mode, an attacker can send a null frame to the AP with power management (PM) bit reset to 0 indicating the client device is awake. In response to such a null frame, the AP may start delivering data and after several retries to the client device that is actually in a sleep mode. Eventually, the AP may discard the data.

In some embodiments, the systems and methods may prevent waste of power due to reuse of the PSP for off channel activity by preventing the client device from sending unnecessary null frames and staying awake for more time to receive the next beacon frame. For example in a conventional 802.11, when the client device needs to go off channel, the client device sends a null frame with the PM bit set to 1 to appear to the AP as though the client device is entering the power save mode. In the subsequent beacon frame, the client device may not be available even after the AP informs data availability in the traffic information map (TIM) field because the client device may not be in the AP's channel to receive the beacon frame. When the client device connects to the AP's channel (e.g., the home channel), the client device may need to wait for a longer time to receive the beacon frame to determine packet availability. In some conventional systems, the client device has to anonymously send a null frame to AP with the PM bit reset to 0 indicating that at the client device is back to active, but the AP may still not have any data for the client. Hence, the client device has to send back another null frame with PM bit set to 1 to the AP after sensing inactivity. These additional transmissions reduce efficiency in conventional networks.

In some embodiments, the systems and methods allow more efficient handling of periodic off channel activities. In some embodiments, the systems and methods reduce reoccurring issues due to the off channel situations discussed above including but not limited to wastage of power on the client side as the client device transmits redundant null data frames and delays for data or beacon frames from the AP.

In some embodiments, an AP assisted secure power save protocol (SPSP) reduces transmission of redundant null data frames and delay times associated with data or beacon message reception from the AP. In some embodiments, the SPSP can be used by all the low power WiFi clients and can coexist with legacy power save protocols and legacy devices. In some embodiments, systems and methods do not use unsecured null data frames for power save modes according to conventional PSP protocols. In some embodiments, the power management (PM) bit or flag in the frame control field is only for the information purpose, and the AP does not change the power save state of a client device using an SPSP in response to such a flag. The TIM field in the beacon frame indicates the upcoming arrival of the SPSP frame and does not indicate the pending data on the AP side for the SPSP supported client device in some embodiments. In some embodiments, a more data bit in the control frame is valid only for the secured frames once the frame is decrypted successfully by the receiver and the more data bit in all the unsecured frames is ignored using SPSP.

A traffic indication map (TIM) may refer to a structure used in 802.11 wireless network management frames to indicate traffic status in the network. The TIM may refer to data indicating status for devices in the network, such as an information element under section 7.3.2.6 of the IEEE 802.11-1999 standard in some embodiments The IEEE 802.11 standards use a bitmap to indicate to any sleeping listening stations that the AP has buffered data waiting for it. Because client devices should listen to at least one beacon during the listen interval, the AP periodically sends this bitmap in its beacons signals or frames as an information element. In some embodiments, the TIM is a bit mask including 2008 bits, each bit representing the association identification (AID) of a station. However, in most situations an AP only has data for a few client devices so only the portion of the bitmap representing those stations needs to be transmitted. A partial bitmap can be referred to as a virtual bitmap, and the portion that is actually transmitted is referred to as a partial virtual bitmap in some embodiments.

In some embodiments, a protocol is provided for a client device which is connected with a protected management frame (PMF) enabled secured AP. The client device can use an enhanced security association-query (SA-query) based SPSP action frame for the power save purpose, thereby eliminating the need of using the legacy null frame with a PM based unsecured data frame in some embodiments. In some embodiments, the protocol provides for a way for the AP to inform the client device(s) about its data availability in a secure and robust way. In some embodiments, the SA-Query Action frame is used for parameters for the SPSP.

Some embodiments relate to a device. The device includes circuitry configured to provide at least one frame after an access point to station association or authentication operation. The frame includes data indicating a data pause resume request or a data on indication.

In some embodiments, the frame is provided according to an 802.11 protocol. In some embodiments, the data pause resume request indicates a periodic sleep mode. The frame includes a field for the data indicating the data pause resume request, and a field for the data indicating the data on indication. In some embodiments, the field for the data indicating the data pause resume request includes data indicating a time period for a sleep mode. In some embodiments, the field for the data indicating the data pause resume request comprises data indicating a periodic time period for a sleep mode. In some embodiments, the data on indication indicates a length of time for providing data or a stay on until data complete indication. In some embodiments, the data indicating the data pause resume request includes the data indicating a time period for a sleep mode or the periodic time period for the sleep mode. In some embodiments, the device comprises a station or an access point.

Some embodiments relate to a device. The device includes circuitry configured to provide at least one encrypted frame. The frame includes data indicating a request to pause a data communication and resume the data communication after a time period.

In some embodiments, the data indicates an amount for the time period. In some embodiments, the data indicates that the time period continues until the data communication is completed. In some embodiments, the device is configured to receive a frame indicating that the data communication is completed. In some embodiments, the data includes a two byte field indicating an amount for the time period. In some embodiments, the data indicating the data pause resume request includes an indication of a time period for a sleep mode or a periodic time period for the sleep mode.

Some embodiments relate to a method. The method includes establishing a secure connection between a first device and a second device, and providing at least one frame including data indicating a data pause resume request or a data on indication on the secure connection.

In some embodiments, the frame is provided according to an 802.11 protocol. In some embodiments, the data on indication indicates a periodic sleep mode. In some embodiments, the frame includes a field for the data indicating the data pause resume request and a field for the data indicating the data on indication. In some embodiments, the field for the data indicating the data pause resume request includes an indication of a time period for a sleep mode.

An access point to station association or authentication operation may refer to an association operation, an authentication operation, or combination thereof involving a STA and an AP in some embodiments. A data pause resume request may refer to a frame sent by a client requesting pausing of data exchange on a channel or a frame sent by a client requesting resumption of data exchange on a channel in some embodiments. A data on indication may refer to a frame sent by an AP to a client to inform the client of data availability status in some embodiments. A field may refer to a portion of a data construct (e.g., a frame) for data having a particular meaning in some embodiments. A more data indication may refer to data indicating that more data is available for provision by an AP to a STA in some embodiments.

A periodic time period may refer to a time period that is repeated in some embodiments. A periodic sleep mode may refer to a sleep mode that is repeated for a time period in some embodiments. A stay on until data complete indication may refer to data indicating that a device should remain on until a data transaction is complete or until the device receives a message indicating more data is not available in some embodiments.

A connection may refer to instituting communication between nodes (such as a wireless communication between nodes) be exchanging data for communicating according to a protocol in some embodiments. In some embodiments, a connection is established using the three-way handshake mechanism in some embodiments. A secure connection may refer to a connection that provides data in a format that cannot easily be obtained by another party in some embodiments. Various methods can establish a secure connection including but not limited to a data encryption method. In some embodiments, data encryption employs algorithms that encrypt and decrypt the information, including but not limited to: WPA and WPA2 operations under the 802.11 standard (e.g., temporal key integrity protocol (TKIP) and advanced encryption standard (AES).

A channel may refer to any portion of the electromagnetic spectrum used to communicate data. The portions can have various bandwidths and can be combined to form wider bandwidths or channels. Channels can have 5 MHz spacing about a center frequency and can occupy a band of at least 20 MHz in some embodiments. A primary control channel may refer to a channel in a bandwidth of a larger channel (e.g., wider bandwidth) that includes a secondary bandwidth channel or secondary channel in some embodiments. In some embodiments, the primary control channel uses an upper half or lower half of the bandwidth of the wider channel, and the secondary channel uses the remaining half of the bandwidth of the wider channel. In some embodiments, the bandwidths of the primary bandwidth channel and the secondary bandwidth channel are not equal, and the primary control channel occupies a sub band and one or more secondary channels occupy the remaining sub bands in the wider bandwidth. In some embodiments, the secondary channel has more or less bandwidth than the primary control channel. In some embodiments, the primary control channel is used for client devices that only support a smaller channel bandwidth (e.g., 20 MHz) while the primary control channel and the secondary channel(s) can be used for client devices that support wider channel capabilities. In some embodiments, there are multiple secondary bandwidth channels and a single primary bandwidth channel, each having the same bandwidth. The terms primary and secondary do not connote a specific priority and can be interchanged with first and second and vice versa in some embodiments.

In some embodiments, the primary control channel is a common channel of operation for all stations (STAs) that are members of the basic service set (BSS). For example, in a 20 MHz, 40 MHz, 80 MHz, 160 MHz or 80+80 MHz, 320 MHz bandwidth BSS, the primary control channel is a 20 MHz channel. The primary control channel is used for transmitting all the management frames while the secondary channels are neighboring channels of the primary control channel in some embodiments. The secondary channels can combine with the primary channel to form another primary channel of the next wider bandwidth. A primary control channel may refer to any channel used to send and receive management frames including but not limited to beacon frames, probe request/response frames, authentication request/response frames, association request/response frames, deauthentication frames, disassociation frames, etc.

Authentication and association under 802.11 standards provides a method for supplying different levels of access to client devices in a network. Connection between an AP and a STA must generally be authenticated and associated with an AP before data packets can be exchanged using the connection. Wireless networks can employ a power save protocol (PSP) where client stations enter a sleep mode, during which the client stations are unable to transmit or receive data on a home channel in order to conserve energy or to perform other operations (e.g., operations on other channel). Per PSP, the client can enter sleep mode after connection (after authentication and association).

An authentication operation may refer to a procedure for how a client device gains access to the network in some embodiments. Authentication provides proof of identity to ensure the client is allowed access to the network in some embodiments. An association operation may refer to a procedure for a client device that has been authenticated to become associated with an AP in some embodiments. Association allows the network to determine where to send data that is intended for a client device (e.g., data is sent through the AP with which the client device is associated) in some embodiments. Generally, a client device is only associated with a single AP in some embodiments.

A sleep mode may refer to a mode of operation where a device communicating on a network reduces its communication (e.g., to save power) in some embodiments. In some embodiments, a sleep mode may involve the device being in a mode where it does not receive or transmitting data for a time period or until further notice in an existing channel. For example, a STA may be considered in a sleep mode because it is not communicating on a first channel (e.g., a home channel) even though it is using power to communicate on another channel or performing a channel scanning operation on other channels in some embodiments.

A frame may refer to a digital data transmission unit in some embodiments. For example, a frame may refer to a container for a single network packet. A data frame may refer to a frame that contains data. An encrypted frame may refer to a frame that has been encrypted in some embodiments.

A. Computing and Network Environment

Prior to discussing specific embodiments of the present solution, it can be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more access points (APs) or network devices 106, one or more client devices (e.g., STAs) or wireless communication devices 102 and a network hardware component or network hardware 192. The wireless communication devices 102 can for example include laptop computers, tablets, personal computers, and/or cellular telephone devices. The details of an embodiment of each station or wireless communication device 102 and AP or network device 106 are described in greater detail with reference to FIGS. 1B and 1C. The network environment can be an ad hoc network environment, an infrastructure wireless network environment, a subnet environment, etc. in one embodiment. The network devices 106 or APs can be operably coupled to the network hardware 192 via local area network connections. Network devices 106 are 5G base stations in some embodiments. The network hardware 192, which can include a router, gateway, switch, bridge, modem, system controller, appliance, etc., can provide a local area network connection for the communication system. Each of the network devices 106 or APs can have an associated antenna or an antenna array to communicate with the wireless communication devices in its area. The wireless communication devices 102 can register with a particular network device 106 or AP to receive services from the communication system (e.g., via a SU-MIMO or MU-MIMO configuration). For direct connections (e.g., point-to-point communications), some wireless communication devices can communicate directly via an allocated channel and communications protocol. Some of the wireless communication devices 102 can be mobile or relatively static with respect to network device 106 or AP.

In some embodiments, a network device 106 or AP includes a device or module (including a combination of hardware and software) that allows wireless communication devices 102 to connect to a wired network using wireless-fidelity (WiFi), or other standards. A network device 106 or AP can sometimes be referred to as a wireless access point (WAP). A network device 106 or AP can be implemented (e.g., configured, designed and/or built) for operating in a wireless local area network (WLAN). A network device 106 or AP can connect to a router (e.g., via a wired network) as a standalone device in some embodiments. In other embodiments, network device 106 or AP can be a component of a router. Network device 106 or AP can provide multiple devices access to a network. Network device 106 or AP can, for example, connect to a wired Ethernet connection and provide wireless connections using radio frequency links for other devices 102 to utilize that wired connection. A network device 106 or AP can be implemented to support a standard for sending and receiving data using one or more radio frequencies. Those standards, and the frequencies they use can be defined by the IEEE (e.g., IEEE 802.11 standards). A network device 106 or AP can be configured and/or used to support public Internet hotspots, and/or on a network to extend the network's Wi-Fi signal range.

In some embodiments, the access points or network devices 106 can be used for (e.g., in-home, in-vehicle, or in-building) wireless networks (e.g., IEEE 802.11, Bluetooth, ZigBee, any other type of radio frequency based network protocol and/or variations thereof). Each of the wireless communication devices 102 can include a built-in radio and/or is coupled to a radio. Such wireless communication devices 102 and/or access points or network devices 106 can operate in accordance with the various aspects of the disclosure as presented herein to enhance performance, reduce costs and/or size, and/or enhance broadband applications. Each wireless communication device 102 can have the capacity to function as a client node seeking access to resources (e.g., data, and connection to networked nodes such as servers) via one or more access points or network devices 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
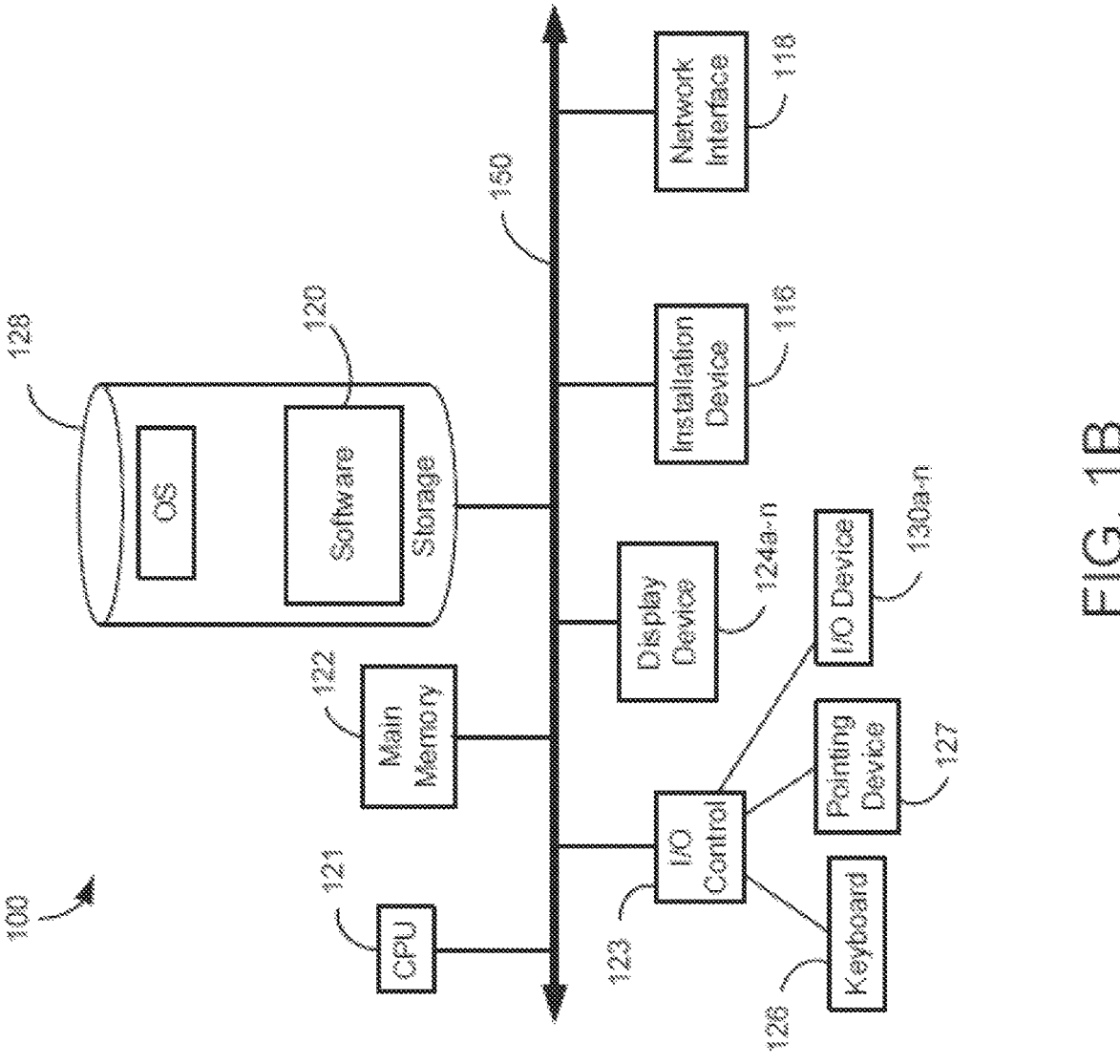
FIGS. 1B and 1C are block diagrams depicting computing devices useful in connection with the methods and systems described herein, according to some embodiments.
Figure 1C:
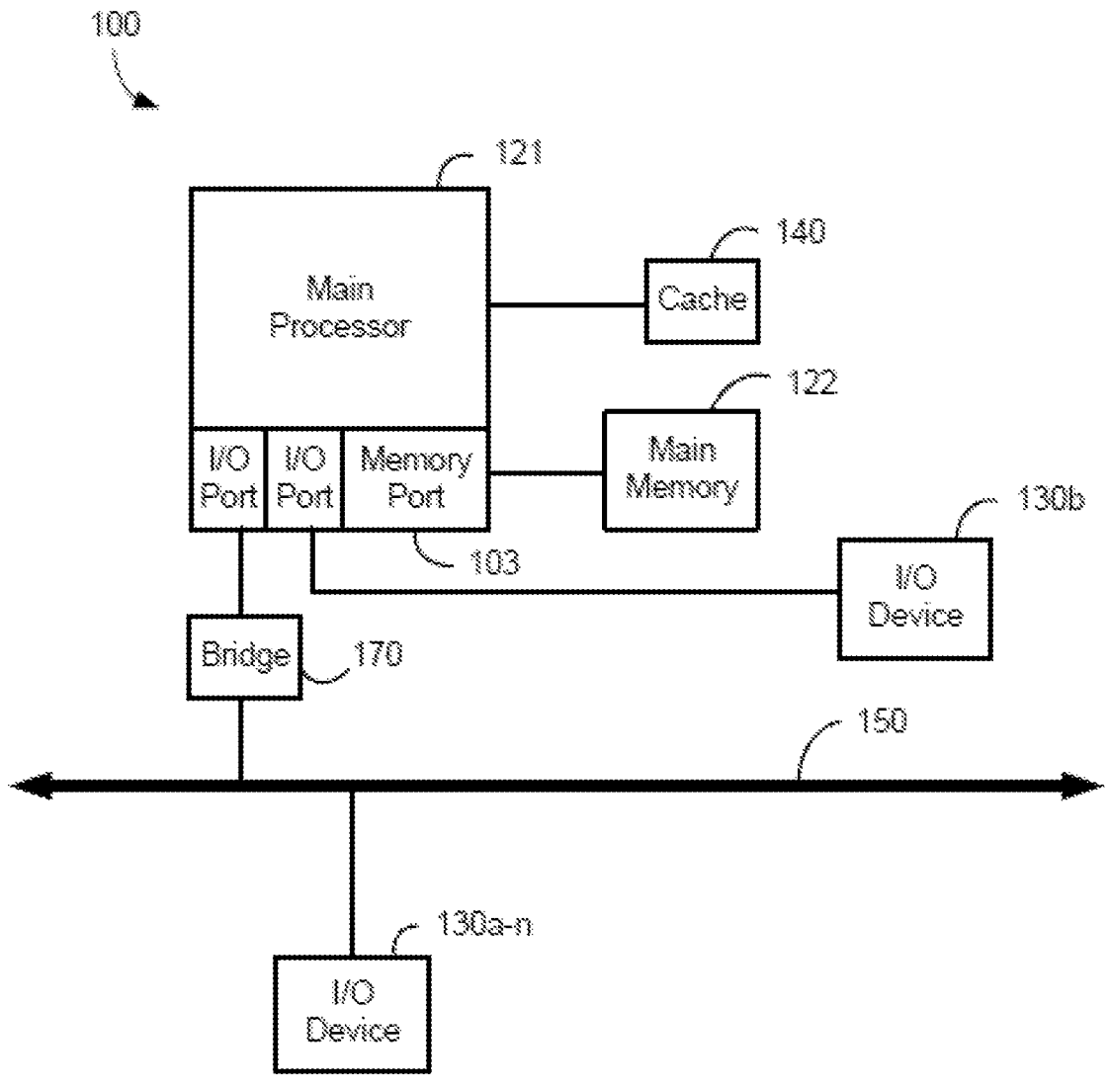

The communications device(s) 102 and access point(s) or network devices 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or network device 106. As shown in FIGS. 1B and 1C, each computing device 100 includes a processor 121 (e.g., central processing unit), and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include an operating system and/or software. As shown in FIG. 1C, each computing device 100 can also include additional optional elements, such as a memory port 103, a bridge 170, one or more input/output devices 130a-130n, and a cache memory 140 in communication with the central processing unit or processor 121.

The central processing unit or processor 121 is any logic circuitry that responds to and processes instructions fetched from the main memory unit 122. In many embodiments, the central processing unit or processor 121 is provided by a microprocessor unit, such as: those manufactured by Intel Corporation of Santa Clara, California; those manufactured by International Business Machines of White Plains, New York; or those manufactured by Advanced Micro Devices of Sunnyvale, California. The computing device 100 can be based on any of these processors, or any other processor capable of operating as described herein.

Main memory unit 122 can be one or more memory chips capable of storing data and allowing any storage location to be directly accessed by the microprocessor or processor 121, such as any type or variant of Static random access memory (SRAM), Dynamic random access memory (DRAM), Ferroelectric RAM (FRAM), NAND Flash, NOR Flash and Solid State Drives (SSD). The main memory unit 122 can be based on any of the above described memory chips, or any other available memory chips capable of operating as described herein. In the embodiment shown in FIG. 1B, the processor 121 communicates with main memory unit 122 via a system bus 150 (described in more detail below). FIG. 1C depicts an embodiment of a computing device 100 in which the processor communicates directly with main memory unit 122 via a memory port 103. For example, in FIG. 1C the main memory unit 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory unit 122 and is provided by, for example, SRAM, BSRAM, or EDRAM. In the embodiment shown in FIG. 1C, the processor 121 communicates with various I/O devices 130 via a local system bus (e.g., system bus 150). Various buses can be used to connect the central processing unit or processor 121 to any of the I/O devices 130, for example, a VESA VL bus, an ISA bus, an EISA bus, a Micro Channel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer or computer system 100 in which the main processor 121 can communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130*a* using a local interconnect bus while communicating with I/O device 130*b* directly.

A wide variety of I/O devices 130*a*-130*n* can be present in the computing device 100. Input devices include keyboards, mice, track pads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium for the computing device 100. In still other embodiments, the computing device 100 can provide USB connections (not shown) to receive handheld USB storage devices such as the USB Flash Drive line of devices manufactured by Twintech Industry, Inc. of Los Alamitos, California.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124*a*-124*n*. As such, any of the I/O devices 130*a*-130*n* and/or the I/O controller 123 can include any type and/or form of suitable hardware, software, or combination of hardware and software to support, enable or provide for the connection and use of the display device(s) 124*a*-124*n* by the computing device 100. For example, the computing device 100 can include any type and/or form of video adapter, video card, driver, and/or library to interface, communicate, connect or otherwise use the display device(s) 124*a*-124*n*. In one embodiment, a video adapter can include multiple connectors to interface to the display device(s) 124*a*-124*n*. In other embodiments, the computing device 100 can include multiple video adapters, with each video adapter connected to the display device(s) 124*a*-124*n*. In some embodiments, any portion of the operating system of the computing device 100 can be configured for using multiple display devices 124*a*-124*n*. In further embodiments, an I/O device 130 can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a Fibre Channel bus, a fiber optic bus, a Serial Attached small computer system interface bus, a USB connection, or a HDMI bus.

A computing device 100 of the sort depicted in FIGS. 1B and 1C can operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7, 8 and 10, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system or computing device 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. In some embodiments, the computing device 100 can have different processors, operating systems, and input devices consistent with the device. For example, in one embodiment, the computing device 100 is a smart phone, mobile device, tablet or personal digital assistant. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Client Device and AP Communication

Disclosed herein are systems for and a methods that can be used in any communication system including but not limited to Wi-Fi networks. The systems and methods can be used with an AP or STA in a communication network. Although embodiments of an SPSP under the IEEE 802.11 standard are described herein, the systems and methods can be used with other networks (cellular networks) and in point to point communications.

Figure 2A:
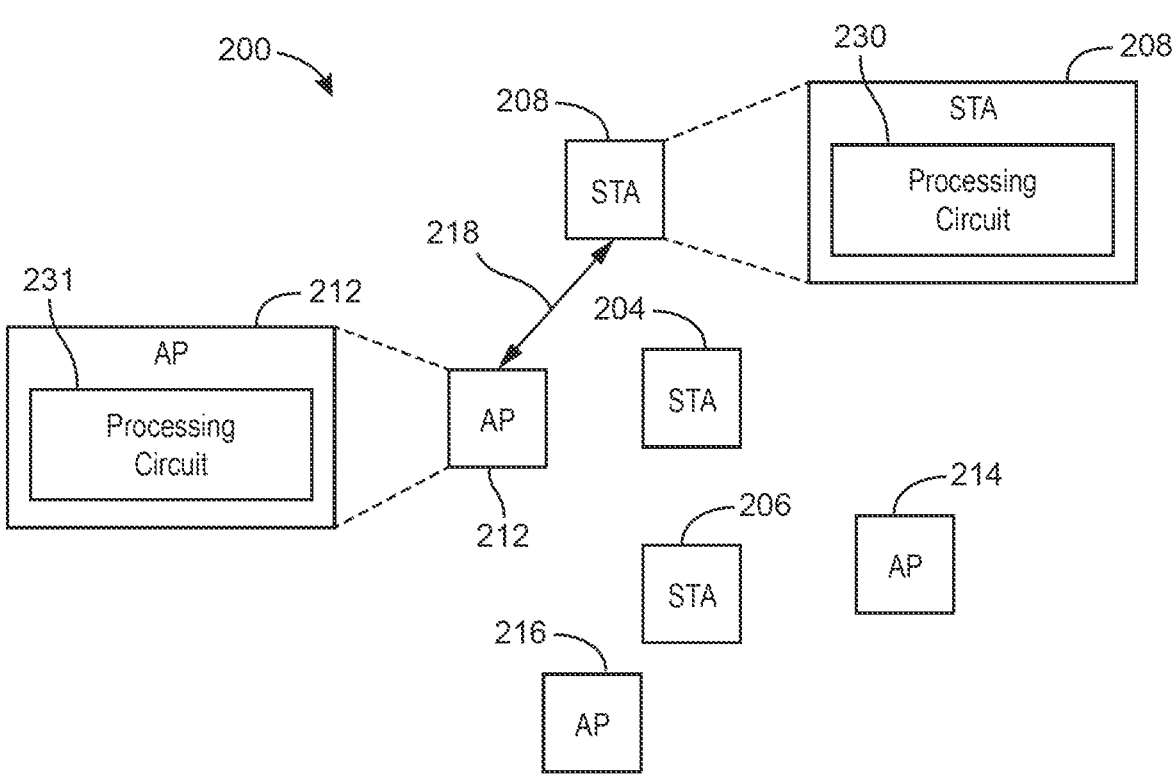
FIG. 2A is a block diagram depicting a network including access points (APs) and stations (STAs), according to some embodiments.

With reference to FIG. 2A, a wireless communication network or system 200 includes client devices or STAs 202, 204, 206, and 208 and APs 212, 214, and 216. STAs 202, 204, 206, and 208 and APs 212, 214, and 216 can be used in the systems discussed with reference to FIGS. 1A-C. Any number of STAs 202, 204, 206, and 208 and APs 212, 214, and 216 can be used in the network or system 200. A STA or client device may refer any device for communicating in communication system and includes but is not limited to a fixed, portable, or mobile laptop, desktop personal computer, personal digital assistant, work station, wearable device, smart phone, or Wi-Fi phone in some embodiments. An access point or AP may refer to a device for communicatively coupling one or more non-AP devices (e.g., a client device or STA) to a network in some embodiments. An AP may enable non-AP devices to connect and communicate with a network in some embodiments. In some embodiments, an AP is a wireless access point (WAP) configured to enable wireless communication between non-AP devices. An AP includes but is not limited to a mobile, portable, or fixed hot spot, router, bridge, or other communication device. An AP can provide services to a STA, such as serving as a connection point to another network.

STAs 202, 204, 206, and 208 and APs 212, 214, and 216 can each include a wireless transceiver and a various modules for communicating via connections. The modules can be software (e.g., firmware), hardware components, and combinations thereof. In some embodiments, each of STAs 202, 204, and 206 and APs 212, 214, and 216 includes an IEEE 802.11 conformant media access control (MAC) layer circuit and physical (PHY) layer interface to the wireless medium and can be part of a larger device or system. In some embodiments, each of STAs 202, 204, 206, and 208 and APs 212, 214, and 216 operates according to other standards than the IEEE 802.11 standard.

A connection for wireless communication can be established between at least one of STAs 202, 204, 206, and 208 and APs 212, 214, and 216 after authentication and association. For example, STA 208 has a connection 218 to AP 212. STAs 202, 204, 206, and 208 each include circuitry (e.g., a processor or processing circuit 230), and APs 212, 214, and 216 each include circuitry (e.g., a processing circuit 231) for establishing and cancelling the connection 218 and communicating data across the connection and operating according to a SPSP. The connection 218 is a wireless connection formed using an association and/or authorization operation and cancelled using a disassociation and/or deauthentication operation in some embodiments. The connection 218 can be on a home channel associated with AP 212 and can be a secure connection (e.g., using encryption) in some embodiments.

Figure 2B:
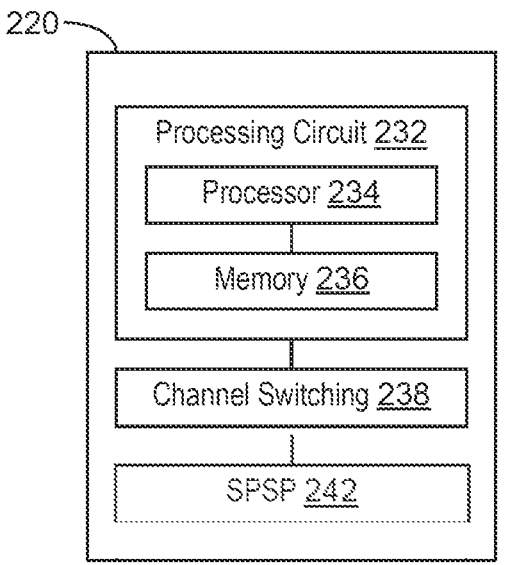
FIG. 2B is a more detailed block diagram of an AP or STA configured for secure pause resume operations according to some embodiments.

Referring to FIG. 2B, a device 220 is an AP 212 or STA 208 (FIG. 2A) and is configured for SPSP operations according to some embodiments. In some embodiments, device 220 is configured for dynamic sub band operations according to some embodiments. In some embodiments, device 220 includes a processing circuit 232, a channel switching module 238, and an SPSP module 242. The processing circuit 232 is any circuitry or components that can perform logic and communication processing operations and can include a processor 234 and a memory 236 in some embodiments.

In some embodiments, the processing circuit 232 is implemented as a field-programmable gate array, an application-specific integrated circuit, hardware, a software executing processor, or state machines. In some embodiments, the processing circuit 232 is part of layers (e.g., MAC, network, PHY layers) of IEEE 802.11 standard devices. The processing circuit 232 can be configured to perform communication operations, frame building and processing, association operations, authorization operations, connection setup, disassociation operations, SPSP operations, and deauthentication operations in some embodiments. Instructions for the processing circuit 232 are stored in a non-transitory medium such as memory 236 in some embodiments. Processing circuit 230 of STA 208 and processing circuit 231 of AP 212 are similar to processing circuit 232 in some embodiments.

The memory 236 may be one or more devices (e.g., RAM, ROM, Flash memory, hard disk storage) for storing data and/or computer code for completing and/or facilitating the various processes described herein. The memory 236 may be or include non-transient volatile memory, non-volatile memory, and non-transitory computer storage media. Memory 236 may include database components, object code components, script components, or any other type of information structure for supporting the various activities and information structures described herein. Memory 236 may be communicably coupled to the processor 234 and include computer code or instructions for executing one or more processes described herein. The processor 234 may be implemented as one or more application specific integrated circuits (ASICs), field programmable gate arrays (FPGAs), a group of processing components, a software executing processor, state machines or other suitable electronic processing components. As such, AP or network device 106 (FIG. 1A) is configured to run a variety of modules and/or programs and store associated data in a database of the memory 236. The modules (e.g., modules 238 and 242) can be implemented in AP software (e.g., MAC layer or PHY layer software) or STA software (e.g., MAC layer or PHY layer software). In some embodiments, the AP 212 or STA 208 (FIG. 2A) is structured and used to establish connections with other computing systems and devices (e.g., wireless communication device(s) 102, network hardware 192, other access points or network devices 106, (FIGS. 1A-C) via a network (e.g., WAN connection, LAN connection, WLAN connection, etc.).

In some embodiments, processing circuit 232 includes a channel switching module 238. The channel switching module 238 can be configured to communicatively coupling with one or more client devices (e.g., non-AP devices 102 or STAs 202, 204, 206, and 208 (FIG. 2A)) and can be configured to allocate the one or more devices 102 on one of a primary bandwidth channel or a secondary bandwidth channel. In particular, the channel switching module 238 can be configured to perform the dynamic sub band operations and/or scan operations. For example, the channel switching module 238 can be configured to determine a network traffic of the devices 102. Accordingly, the channel switching module 238 may utilize a channel switching protocol to improve network traffic (e.g., uplink traffic and downlink traffic) from the AP 212 to the device(s) 102. That is, device(s) 102 may be split between different parts of the 320 MHz spectrum, on different channels. The channel switch protocol includes moving between primary and secondary channels. In particular, channel switching module 238 enable an AP 212 to dynamically switch devices 102 between channels based on, for example actual network traffic and/or expected network traffic. For example, the channel switching module 238 can be configured to switch the device 102 (FIG. 1) (or AP 212 or STA 208) from a primary bandwidth channel or home channel to operate on a secondary bandwidth channel. In particular, the channel switching module 238 can determine if a device 102 or AP 212 should switch channels based on (i) a bandwidth availability and (ii) a quality of service requirement. Module 238 can be any circuit or circuitry (with or without software) configured to designate one or more devices to communicate on a channel or portion of a channel (including but not limited to a primary control channel). Module 238 can be used to perform a scanning operation and return to a home channel in some embodiments.

In some embodiments, the SPSP module 242 provides protocol defined in the client side as direct beneficiary and in the AP side as an assist to the client device. In some embodiments, the module 242 receives or provides a protected management frame (PMF) so that the client device is connected to the AP using the PMF. A PMF enabled AP uses an enhanced SA-query based action frame (e.g., an SPSP frame) provided by module 242 for power saving operations in some embodiments. In some embodiments, an SPS action frame (e.g., an SPSP frame) is provided from the STA 208 to the AP 212 or vice versa after a secure connection is achieved. In some embodiments, the SPS action frame has seven action codes or fields. Example action codes for the SPS action frame are provided below. Codes 2-3 are reserved for other features.

| Action Code | Description |
| --- | --- |
| 0 | SA-Query Request |
| 1 | SA-Query Response |
| 4 | SPSP Data Pause-Resume Request |
| 5 | SPSP Data On Indication |
| 6 | SPSP Data Pause-Resume Request Periodic |

In some embodiments, the SPSP module 242 uses a SPSP data pause-resume request (e.g., action code 4). The SPSP data pause-resume request may refer to a code, message or frame (e.g., action code 3 in an SPS action frame) sent by the client device to the AP or vice versa to request pausing or resumption of communication in some embodiments. In some embodiments, SPSP data pause-resume request is a frame sent by the client device to the AP to request pausing a unicast data delivery immediately and/or to request resumption of the traffic after the requested timeout. In some embodiments, a pause timeout value is provided in the SPS action frame. When the pause timeout value is 0, the data delivery can be resumed immediately. In some embodiments, the AP resumes the data delivery almost immediately as the operation is time bound and any delay or inactivity by the AP beyond 20 ms could lead to the client device going back to sleep or going back to off channel activity automatically. In some embodiments, a response (e.g., a response frame from the AP) to the SPSP data pause-resume request is not expected (e.g., only an action is expected). In some embodiments, the transaction identifier in the SA-query request/response is redundant and the two byte field in the transaction identifier of the SA-query request/response is used for providing an SPSP parameter. In some embodiments, the two byte field is configured as follows. SPSP Parameter Description: Bit (0) 0-Auto Resume, 1-PM mode; Bit[15:1] Timeout value in 16 us (Minimum: 32 us and Maximum: 1048544 us).

Using the SPSP parameter value as set forth above, the following exemplary operations are possible:

1. The client device can request a desired time (110 ms) to pause the unicast data traffic from the AP and resume the traffic automatically after the expiry. Sample value: 0x6E0. The auto resume inactivity timeout should be a maximum 20 ms in some embodiments.

2. The client device can request a desired time (256 ms) to pause the unicast data traffic from the AP and then ask the AP to follow the SPSP protocol for further data delivery. Sample value: 0x3E81.

3. The client device can request the AP to resume the traffic immediately as if it is active, similar to null data with PM reset to 0 in conventional 802.11 networks, but secured. Sample value: 0x0.

4. The client device can request the AP to follow the existing SPSP path immediately as the client device is entering the sleep mode, similar to null data with PM 1 in conventional 802.11 networks, but secured. Sample value: 0x1.

5. The client device can request a desired time (900 ms) to pause the unicast data traffic from the AP and can extend it for further 600 ms by sending another frame. Sample value: 0xDBBA and 0x.927D.

In some embodiments, the SPSP module 242 uses an SPSP data on indication (e.g., action code 4 in an SPS action frame). The SPSP data on indication refers to a code, message or frame sent by the AP to a client device to inform the data availability status at the AP side in some embodiments. If the data availability status is a no data indication, the client device can go back to a sleep mode (e.g., turn off its radio or perform off channel operations) immediately in some embodiments. The data availability status is used for informing the client to stay awake for an extended period of time in some embodiments. The data availability status is used for informing the client about the fresh availability of data in some embodiments. The AP may send the SPSP data on indication to inform the client device of the non-availability of by filling the value as zero or another predetermined value whenever the AP senses that the client device is awake but the client device is not required to be awake or on channel in some embodiments. The AP may send the SPSP data on indication to inform the client device about the availability of data for an extended period of time, so that the client device does not go to sleep or off channel prematurely in some embodiments.

The AP may deliver SPSP data on indication around the time of delivery traffic indication message-0 (DTIM-0) with a broadcast destination address having the payload contents similar to TIM's information element (IE) bitmap control and shortened partial virtual bitmap (PVB) field in some embodiments. Also, the AP may deliver the SPSP data on indication to any individual client device whenever the AP detects the client could be in awake state (e.g., out of sleep mode) at that time. DTIM may refer to a delivery traffic indication message in some embodiments. DTIM can be related to beacons or packets of information that are broadcast through a network. In some embodiments, DTIM is part of the beacon packet that is sent following the beacon broadcast from the AP. The DTIM determines when a device is awake or in a sleep mode. When broadcast and multicast data are sent, DTIM wakes up the client device so that the data can be received.

As a response frame from the client device to the SPSP data on indication is not expected and only an action is expected, the transaction identifier in the SA-query Request/Response is redundant in some embodiments. Hence, this 2 byte field is reused for the SPSP Parameter as follows in some embodiments.

| SPSP Parameter | Description |
|---|---|
| 0 | No unicast data available. |
| Bit[15:0] | Timeout value is 4 micro seconds resolution. Min: 64 us and max: 262 ms. |
| Bit[15:0] | 0xFFFF - Do not sleep till inactivity or till receive secured data with more data set to 0 (the more data bit is in the MAC header in some embodiments). |
| Bit[15:8] & Bit[7:0] | Bitmap control and PVB for eight clients if in case the destination address of the frame is for a broadcast communciation. |

Using the SPSP Parameter value as set forth above, the following exemplary operations are possible in some embodiments:

1. The AP can indicate to the client device about the availability of unicast data for some time (e.g., 40 ms.), so that the client device can stay awake for an extended time to receive data packets from the AP. Sample Value: 0x9C40.
2. The AP can indicate to the client about the unavailability of data, so that the client device can go back to sleep as early as possible. Sample Value: 0x0
3. The AP can communicate the data availability for a particular set of clients in a secured manner and may deliver such frames after DTIM-0 beacon frame.
4. The AP may indicate to the client about the non-quantifiable data availability just to keep the client device awake until the completion of subsequent data delivery. Sample Value: 0xFFFF. The client device would be in awake state for its maximum inactivity time. The bitmap control and PVB carry the same format as defined in the TIM field in some embodiments.

In some embodiments, the SPSP module 242 uses a SPSP data pause-resume periodic indication. The SPSP data pause-resume periodic indication may be in a data pause-resume request periodic frame or message indicating periodic pauses in some embodiments. The SPSP data pause-resume periodic frame is almost identical to the SPSP data pause-resume request frame in some embodiments. The AP honors the same periodicity of the data pause time for the client in every second or other period. As the data pause period is repeated around the same time every second, the pause time is less than a second in some embodiments. In default, the pause time is applicable once in a second, but optionally, the pause time can be extended to multiple times up to 4 in a second. In some embodiments, the SPSP data pause-resume periodic frame has an auto resume field set to ON.

The two byte field is reused for the SPSP parameter as follows.

| SPSP Parameter | Description |
|---|---|
| Bit[1:0] 00 - | Repeat Once in a second |
| 01 - | Repeat two times in a second |
| 10 - | Repeat four times per second |

-continued

| SPSP Parameter | Description |
|---|---|
| 11 - | Repeat eight times per second |
| Bit[2] 0 - | Basic Periodicity |
| 1 - | Additional Periodicity |
| Bit[15:3] | Timeout value is 16 us. Min: 128 us and max: 0xE484 (936 ms) |

Using the SPSP parameter value as set forth above, the following exemplary operations are possible in some embodiments.

1. The client device can request a desired time (256 ms) to pause the unicast data traffic from the AP and resume the traffic automatically after the expiry and repeat the same pattern once in every second. Sample value: 0x3E80. The Auto resume inactivity timeout should be a maximum 20 ms in some embodiments. The AP would inform the packet availability in the rest of the non-pause time period only (744 ms).
2. The client device can request a desired time (256 ms) to pause the unicast data traffic from the AP and resume the traffic automatically after the expiry and repeat the same pattern twice in every second. Sample value: 0x3E81. The Auto resume inactivity timeout should be max 20 ms. The AP informs the packet availability in the rest of the non-pause time period only (256 ms+256 ms).
3. The client device can request a desired time (64 ms) to pause the unicast data traffic from the AP and resume the traffic automatically after the expiry and repeat the same pattern eight times in every second. Sample value: 0xFA3. The auto resume inactivity timeout should be a maximum 20 ms in some embodiments. The AP would inform the packet availability in the rest of the non-pause time period only (8*64 ms) in some embodiments.
4. Client device can send this frame with value as 0 to cancel the periodic operation.
5. This SPSP data pause resume request periodic frame can be used along with the SPSP data pause resume request frame to achieve any out of bound periodic operations. (e.g., 256 ms plus another 128 ms from 640 ms).
6. Te SPSP data pause resume request periodic frame can be used twice (Basic+Additional Periodicity) to achieve any out of bound periodic operations. (256 ms @ 0th ms of a second and 128 ms @ 640th ms of a second).

In some embodiments, an SPSP capable device such as an AP or client device including SPSP module 242 sets either Bit(6) or any other reserved bits (as shown below) in the extended robust security network (RSN) capabilities IE, indicating that the device is SPSP capable and the IE should be sent/exchanged as part of beacon frames, probe response frames, association request frames, association response frames, and the extensible automation protocol (EAPOL) frames. The extended RSM IE refers to fields used in 802.11 in some embodiments. Alternatively, as the PM bit in the beacon/probe response frame from the AP is not significant and normally ignored by the legacy clients, SPSP capability announcements on the AP side can use the PM bit for quick identification of SPSP capable APs. In some embodiments, the extended RSN capabilities IE or field is configured as follows.

US 12,634,827 B2

17
18

| Bit | Information | Notes |
|---|---|---|
| 0:3 | Field Length | The length of the extended RSN capabilities field, in octets, minus 1, e.g., n − 1 |
| 4 | Protectect TWT | The client device sets the protected target wake time operations support (TWT) support filed to 1 when dot11 protected TWT operations implemented is true and sets to 0. Otherwise. |
| 5 | SAE hash-to-element | The client device supports direct hashing to obtain the password element (PWE) instead of looping. |
| 6 – (8*n − 1) | reserved. | |

In addition to a capability exchange through the unsecured management frames or IE, a secured activation mechanism can also be used in some embodiments. Upon associating to the AP and after the 4-way handshake, the SPSP capable client device sends the SPSP data pause-resume request frame with the SPSP parameter set to 0 indicating that the client is SPSP capable and ready to receive data frames from the AP in some embodiments. The SPSP capable AP treats the client device as legacy and follows a legacy PS protocol unless it receives the SPSP data pause-resume request frame from the SPSP capable client device in some embodiments. The SPSP capable AP activates the SPSP capability for the SPSP client device once it receives the first SPSP pause-resume request frame from the client in some embodiments. The AP has to acknowledge the SPSP client by sending a unicast SPSP data-on indication frame with the SPSP parameter as 0xFFFF in some embodiments. The client device activates the SPSP once it receives the SPSP data-on frame from the AP in some embodiments. When the client device does not receive a SPSP data-on indication frame from the AP for its first SPSP data pause-resume request frame, the client device does not activate the SPSP and falls back to a legacy power save protocol in some embodiments.

Use cases for the SPSP are described below for the client device or AP 212 according to some embodiments. With reference to FIG. 2A, when a STA 208 intends to enter a sleep mode, the STA 208 sends an SPSP data pause-resume request with the SPSP parameter set as 1. When a STA 208 intends to come out of a low power mode, the STA 208 sends an SPSP data pause-resume request with SPSP parameter reset to 0. When a STA 208 intends to check data availability of the AP 212, the STA 208 decrypts an SPSP data-on indication frame. If the SPSP data-on indication frame is a unicast frame, the AP 212 may communicate for the duration of the available data or for the duration of the time to stay awake in the on channel to the specific STA 208. When STA 208 determines the end of the available data or the last buffered packet of the AP 212, the SAT 208 decrypts the secured data/management frame and then concludes more data availability.

When the STA 208 enters a sleep/inactive mode or changes to a channel of a home channel for a specific duration, STA 208 sends an SPSP data pause-resume request with SPSP parameter indicating the specific duration for a time out with an auto resume option or parameter. The STA 208 does not receive the TIM field set in the beacon frames during this duration. When the STA 208 intends to enter a sleep/inactive or go out of the home channel for specific duration periodically, the STA 208 sends an SPSP data pause-resume request periodic with an SPSP parameter indicating the duration as a timeout with periodicity option.

STA 208 does not receive the TIM field set in the beacon frames during the inactivity period. The AP 212 may assist the STA 208 reentering the sleep mode by sending SPSP data-on indication with an SPSP parameter reset to 0.

Figure 3:
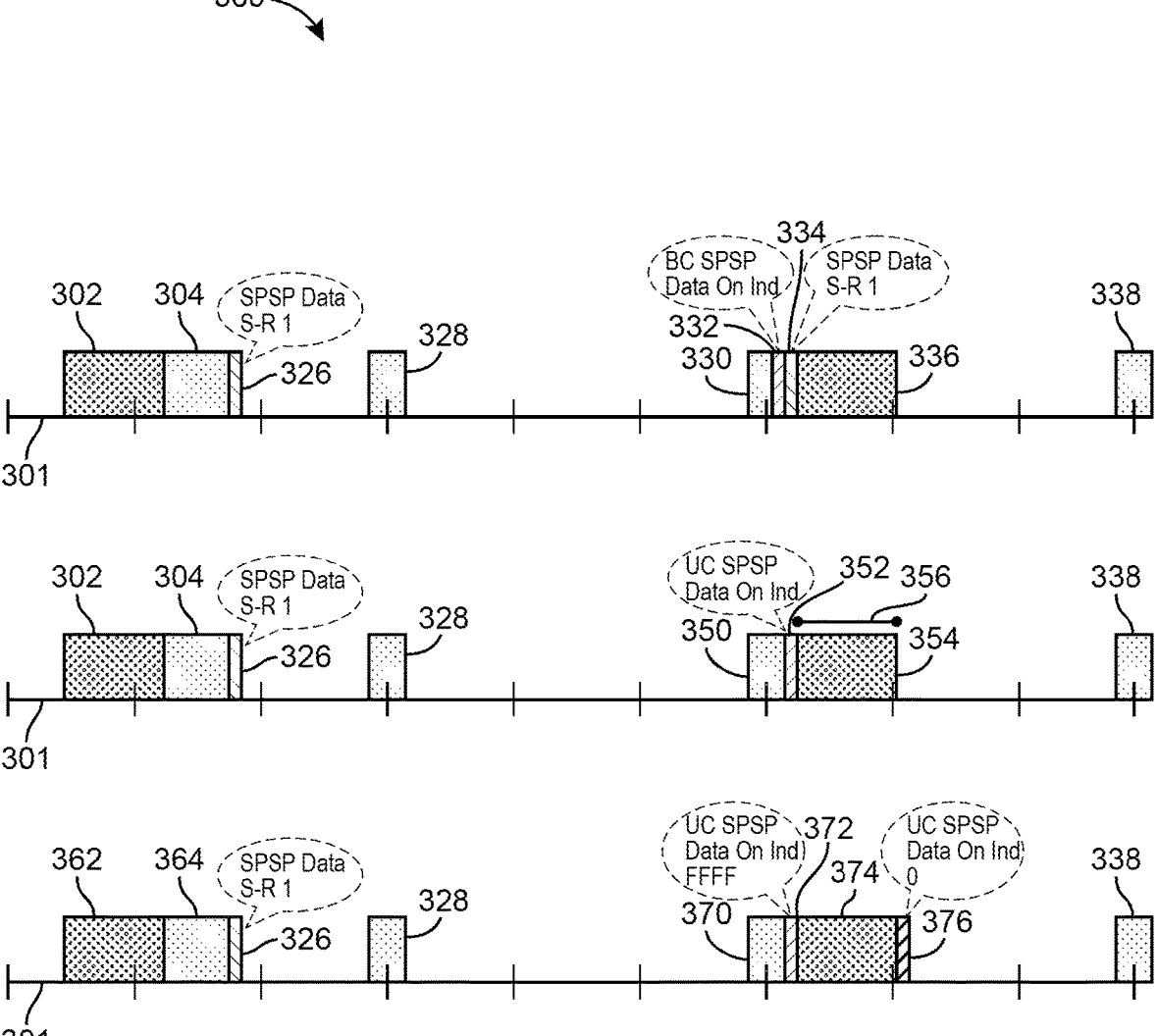
FIG. 3 is a timing diagram showing communication using secure pause resume operations under three scenarios for the network illustrated in FIG. 2A according to some embodiments.

With reference to FIG. 3, communication 300 under three scenarios between STA 208 and AP 212 (FIG. 2A) is shown on an X-axis 301 representing time. After connection of STA 208 and AP 212 (e.g., after association and authentication using frames 302 and 304), STA 208 exchanges basic information and intends to enter power save mode after some amount of idle time. STA 208 sends an SPSP frame 326 with a data pause-resume request set to 1. Once STA 208 sends the SPSP frame 326 with a data pause-resume request set to 1, STA 208 expects data from the AP 212 within a certain time limit (e.g., 20 milliseconds (ms)). Otherwise, the AP 212 cannot send the data to STA 208 unless the AP 212 requests the STA 208 to stay up for an extended time. This advantageously reduces the number of protocol exchanges from the STA 208 related to the power save or sleep modes. When the AP 212 does not have any data to deliver until after the timeout value, AP 212 sends an SPSP with a data on indication with a 0 value to enable the STA 208 to go back to sleep mode in come embodiments.

In some embodiments, STA 208 wakes up at interval 328 to listen for packet availability messages and then returns to a sleep mode. In interval 330 (e.g., defined by a D-TIM period), STA 208 exits the sleep mode and AP 212 provides SPSP frame 332 with a data on indication set to 1 for a broadcast message. In response to the data on indication, STA 208 provides an SPSP frame 334 with a data pause-resume request set to 1 and the AP 212 immediately resumes the traffic (data communication 336) to the STA 208. Once STA sends the SPSP data pause-resume request frame 334 with the SPSP parameter set to 1, STA 208 expects data from the AP 212 within a certain time limit (e.g., 20 ms) in some embodiments. Otherwise, the AP 212 cannot send the data communication 336 to the STA 208 unless the AP 212 requests the STA to remain awake for an extended time (e.g., via SPSP data pause-resume request frame 334 with the SPSP parameter set to 1 and an extended time indication). When the AP does not have any data to deliver after the timeout value associated with interval 330, AP 212 may send the SPSP frame 326 with a data on indication reset to 0 to enable the STA 208 to go back to sleep mode. In some embodiments, STA 208 wakes up at interval 338 to listen for packet availability messages and then returns to a sleep mode.

In some embodiments during an interval 350, STA 208 exits the sleep mode and AP 212 provides an SPSP frame 352 with a data on indication set to 1 for a unicast message. In response to the SPSP data on indication, STA 208 receives the traffic (data communication 354) during an interval 356. STA 208 expects data from the AP 212 within the interval 356 (e.g., 20 ms) in some embodiments. When the AP does not have any data to deliver after the timeout value associated with interval 356, AP 212 may send an SPSP frame with a data on indication reset to 0 to enable the STA 208 to go back to sleep mode. In some embodiments, STA 208 wakes up at interval 338 to listen for packet availability messages and then returns to a sleep mode.

In some embodiments, during interval 370, STA 208 exits the sleep mode and AP 212 provides an SPSP frame 372 with a data on indication set to FFFF for a unicast message. In response to the fame 372 which includes the data on indication (e.g., bits FFFF), STA 208 does not enter the sleep mode until data is no longer available, and STA 208 receives the traffic (data communication 374). Once AP 208 sends an SPSP frame 372 with a data on indication including an indication that data is no longer available (data 0), STA 208 can reenter the sleep mode in some embodiments.

As long as the data arrives regularly, STA 208 is in the awake state and any data inactivity time beyond 20 ms (in case of broadcast communications) or AP specified time limit (in case of unicast) leads to the STA 208 entering sleep state automatically without any frame exchange in some embodiments.

Figure 4:
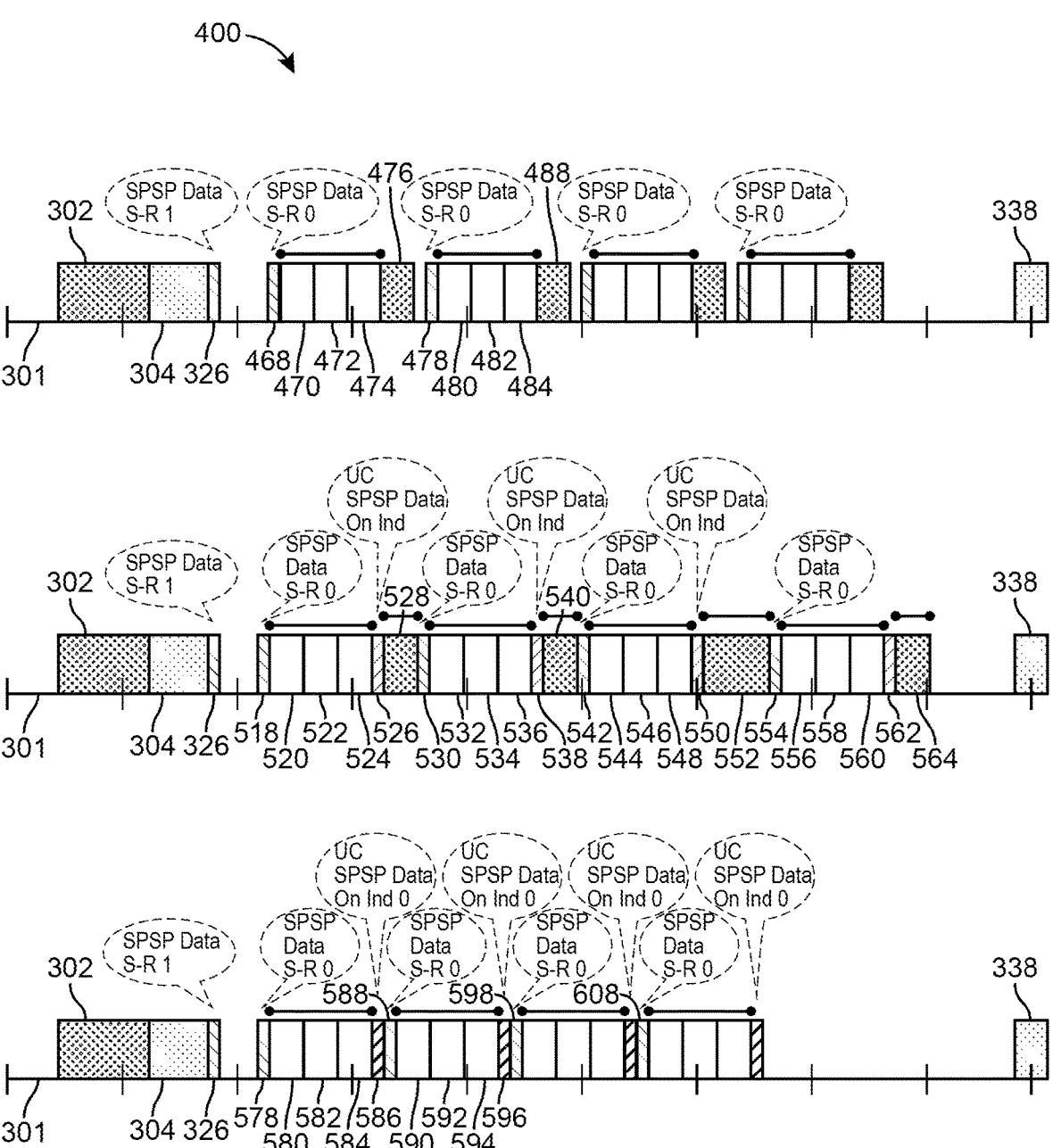
FIG. 4 is a timing diagram showing communication using secure pause resume operations under three scenarios for the network illustrated in FIG. 2A according to some embodiments.

With reference to FIG. 4, communication 400 under three scenarios between STA 208 and AP 212 (FIG. 2A) is shown on an X-axis 301 representing time. After connection of STA 208 and AP 212 (e.g., after association and authentication using frames 302 and 304), STA 208 exchanges basic information and intends to enter power save mode after some amount of idle time. STA 208 sends the SPSP frame 326 with data pause-resume request parameter set to 1. For example, STA 208 sends the SPSP frame 326 because STA 208 is going into sleep state (e.g., performing off channel activities such as a scan for a period (e.g., 120 ms) or a low power mode). In response to frame 326, AP 212 does not send any unicast data to the STA 208 until the STA 208 wakes up.

In some embodiments, STA 208 while connected to AP 212 can perform off channel activity (e.g., a scan for 120 ms). If STA 208 is already in a power save state, STA 208 provides an SPSP frame 468 with data pause-resume request parameter set to 0 and a timeout value of 1D4C (0x1D4C), enters an out of channel mode for intervals 470, 472 and 474, comes back to an on channel mode channel for interval 476 and enters a sleep mode thereafter. Active data traffic exchange with the AP 212 occurs during interval 476 in some embodiments. After interval 476, STA 208 sends the SPSP frame 468 with data pause-resume request parameter set to 0 and a timeout value as 1D4D, goes out of channel at intervals 480, 482 and 484, and comes back on channel and receives data in interval 488.

When the STA 208 suspends the data traffic, the AP 212 is configured to not send a unicast SPSP data on indication in some embodiments. AP may use its channel for other clients as SAT 208 does not receive a broadcast SPSP data on indication when is not on a home channel. Communications can repeat as discussed with reference to intervals 470, 472, 474, and 476 and 480, 482, 484, and 486.

In some embodiments, STA 208 while connected to AP 212 can perform off channel activity (e.g., a scan for 120 ms) during intervals 520, 522 and 524. STA 208 provides an SPSP frame 518 with data pause-resume request parameter set to 0 and a timeout value of 1D4C (0x1D4C, enters an out of channel mode for intervals 520, 522 and 524, comes back to an on channel mode, receives an SPSP frame 526 with a data on indication 538 for a unicast message and receives data during interval 528.

After interval 528, STA 208 sends the SPSP frame 530 with data pause-resume request parameter set to 0 and a timeout value of 1D4C, and goes off channel at intervals 532, 534 and 536. After interval 536, STA 208 comes back to an on channel mode, receives an SPSP frame 538 with a data on indication for a unicast message and receives data during interval 540.

After interval 540, STA 208 sends an SPSP frame with data pause-resume request parameter set to 0 and a timeout value of 1D4C, and goes off channel at intervals 544, 546 and 548. After interval 548, STA 208 comes back to an on channel mode, receives an SPSP frame 550 with a data on indication for a unicast message and receives data during interval 552. Frame 550 can define the length of interval 552. In some embodiments, frame 550 can indicate to STA 212 should continue to receive data in interval 552 until all available data is transmitted.

After interval 552, STA 208 sends an SPSP frame 554 with data pause-resume request parameter set to 0 and a timeout value of 1D4C and goes off channel at intervals 556, 558 and 560. After interval 560, STA 208 comes back to an on channel mode, receives an SPSP frame 586 with a data on indication for a unicast message set to zero and receives data during interval 564.

The lengths of and numbers of intervals 556, 558 and 560 can vary and can be defined by indications in frame 554 in some embodiments. Intervals 564, 552, 540 and 528 can have a length corresponding to the size of the data transfer in some embodiments. The size can be set in frames 562, 550, 538, and 526, respectively. Communications can repeat as discussed above.

In some embodiments, STA 208 can perform off channel activity (e.g., a scan for 120 ms) during intervals 580, 582, and 584 while connected to AP 212. STA 208 provides a SPSP frame 578 with data pause-resume request parameter set to 0 and a timeout value of 1D4C, enters an off channel mode for intervals 580, 582, and 584, comes back to an on channel mode, receives an SPSP frame 586 for a unicast message with a parameter set to zero indicating no data is available for STA 208. No data is transferred. STA 208 sends an SPSP frame 588 with data pause-resume request parameter set to 0 and a timeout value of 1D4C, goes off channel at intervals 590, 592, and 594. After either an auto resume timeout or after receiving the frame including the no data available indication in frame 596, the STA 208 can resume its scan operation by sending SPSP frame 598 with data pause-resume request parameter set to 0 and a timeout value of 1D4C for next scan time (e.g., for period 608). The time out value is selectable and the value 1D4C is exemplary.

Figure 5:
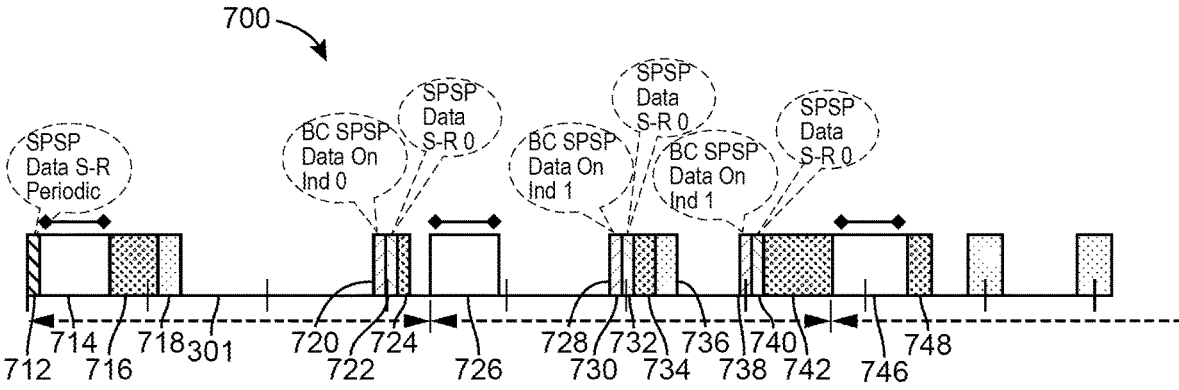
FIG. 5 is a timing diagram showing communication using secure pause resume operations under three scenarios for the network illustrated in FIG. 2A according to some embodiments.
Figure 5:
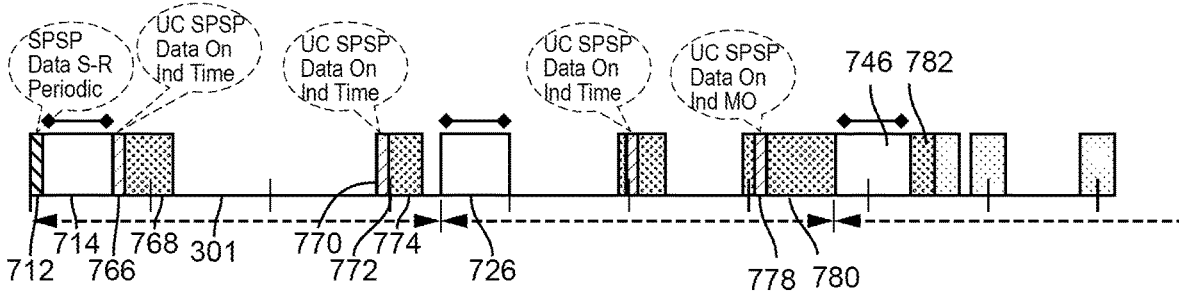
Figure 5:
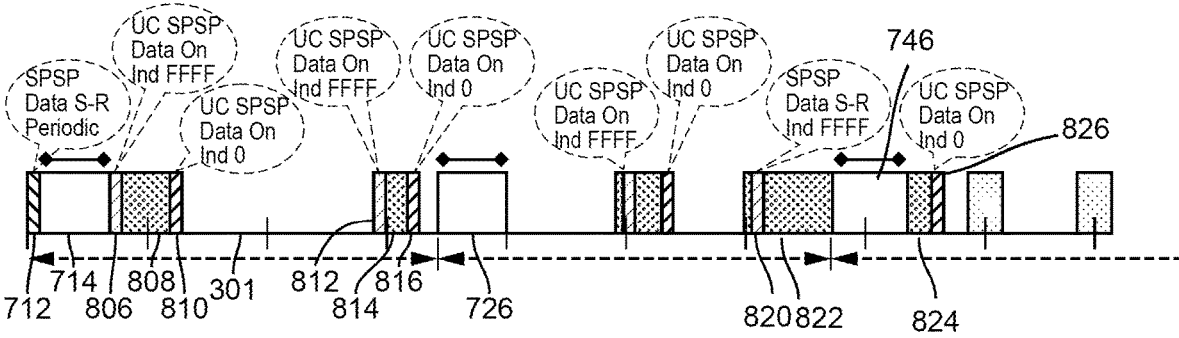

With reference to FIG. 5, communication 700 between STA 208 and AP 212 (FIG. 2A) under three scenarios involving periodic off channel activity is shown on an X-axis 301 representing time. After connection of STA 208 and AP 212 (e.g., after association and authentication using frames 302 and 304), STA 208 can be in an infra off channel activity mode (e.g., similar to neighbor awareness networking (NAN) operation). In some embodiments, STA 208 sends an SPSP frame 712 with SPSP parameter set to zero and a periodicity indication informing that the data traffic is to be paused for an interval 714. The interval (e.g., intervals 726 and 746) repeats in every cycle (a 1 second cycle). In some embodiments, data traffic is paused during intervals 726 and 746. The time period for the intervals and the number thereof can be set in the SPSP frame 712.

AP 212 does not send any unicast data to the STA 208 during intervals 714, 726, and 746. In some embodiments, the SPSP frame 712 defines a time out value of 256 ms for intervals 714, 726, and 746 with a single periodicity (value of zero). Multiple intervals per cycle can be defined in frame 712 in some embodiments. The AP 212 does not notify STA 208 about its data availability during intervals 714, 726, and 746 and instead focuses its operations on other client devices. After 256 ms (e.g., interval 714), STA 208 resumes operations on the home channel and the AP 212 automatically delivers the data if any at interval 716. If no data is provided, STA 208 ca re-enter sleep mode after interval 718.

In some embodiments, STA 208 wakes up or is awake to check for an SPSP frame 720 with a data on indication at interval 722 for broadcast communication based upon the DTIM or other scheduling. If STA 208 receives frame 722 with a no data available indication (bit reset to zero), STA 208 sends an SPS frame 722 with SPSP resume/pause parameter reset to zero informing that the data traffic is to be paused. If the SPSP data on indication is not provided, STA 208 returns to a sleep mode after a certain period (e.g., after interval 724) in some embodiments.

After interval 726, data is not provided by AP 212. If AP 212 provides an SPSP frame 728 with a data on indication set to one, STA 208 sends an SPS frame 722 with SPSP resume/pause parameter reset to zero informing that the data traffic is to be paused. STA 208 receives data during interval 734 and enters sleep mode after interval 736.

If AP 212 provides an SPSP frame 738 with a data on indication set to one, STA 208 sends an SPSP frame 740 with SPSP pause/resume parameter set to zero informing that the data traffic is to be paused. STA 208 receives data during interval 742 and enters sleep mode at the beginning of interval 746. The data transmission can resume at interval 748.

If AP 212 provides an SPSP frame 766 with a data on indication set to one and a time indication for unicast communication, STA 208 receives data during interval 768. Interval 768 can have a length corresponding to the time indication in some embodiments. If AP 212 provides an SPSP frame 770 with a data on indication set to one and a time indication that reaches interval 746, STA 208 receives data during interval 742 and enters sleep mode at the beginning of interval 746. Data transmission is automatically continued in interval 748 after interval 746.

If AP 212 provides an SPSP data on indication 766 with SPSP parameter set to one and a more data indication for a fixed time, STA 208 receives data during interval 768. If AP 212 provides an SPSP data on indication 770 with SPSP parameter set to one and a more data indication for a fixed time, STA 208 receives data during interval 774. If AP 212 provides an SPSP data on indication 778 with SPSP parameter set to one and a more data indication for a fixed time where the fixed time would enter interval 746, STA 208 receives data during interval 780 and interval 782.

If AP 212 provides an SPSP frame 806 for unicast communication with a data on indication with of indication of FFFF (e.g., representing an unknown time for the data transfer), STA 208 receives data during interval 806 until an SPSP frame 810 for unicast communication with a data on indication with set to zero indicating no more data. The indication FFF indicates that STA 208 should receive data until frame 810 is provided in some embodiments. STA 208 can enter a sleep mode after SPSP data frame 810. If AP 212 provides an SPSP frame 812 for unicast communication with a data on indication of FFFF, STA 208 receives data during interval 814 until an SPSP frame 816 for unicast communication with a data on indication with set to zero indicating no more data is available. After interval 816, STA 208 enters a sleep mode in interval 726, a periodic sleep interval defined in frame 812.

If AP 212 provides an SPSP frame 820 for unicast communication with a data on indication with of indication of FFFF (e.g., representing an unknown time for the data transfer), STA 208 receives data during interval 822 until an SPSP frame 810 for unicast communication with a data on indication with set to zero indicating no more data. STA 208 enters a sleep mode during an interval 746, and STA 208 receives data during interval 824 until an SPSP frame 826 for unicast communication with a data on indication set to zero indicating no more data is available.

In some embodiments, communications 300, 500, and 700 are more secure as the SPSP protocol uses a secured link, and hence are protected from data manipulation (that can lead to denial of service) from any attacker device. In some embodiments, the SPSP for communications 300, 500, and 700 reduces the number of frames transmitted from the client device for the power save purpose and hence reduces the power consumption. With AP assistance, the SPSP for communications 300, 500, and 700 allows the client device to go back to sleep (e.g., off channel or reduced power) early and hence the client devices can save more power in some embodiments. Further, SPSP for communications 300, 500, and 700 can co-exist with the legacy protocol for the legacy clients, has periodic off channel flexibility that brings efficiency on the medium, and can be used with sophisticated multi-interface operation (STA, SoftAP, NAN, etc.) more efficiently in some embodiments.

AP 212 can communicate with STA 208 using any type of channel in some embodiments. The channel can be a home channel or primary control sub band (e.g., 20 MHz), or a secondary sub band (e.g., 20 MHz). The channel can also be apportioned as a single wider bandwidth (e.g., 160 MHz), more than one wider bandwidths (e.g., 80 MHz each), or one wide bandwidth (e.g., 80 MHz). Sub bands and wider bandwidths can be referred to as channels, sub bands, bandwidths, or bandwidth channels.

In some embodiments, the channel is an IEEE 802.11 wider bandwidth channel for infrastructure configured for BSS operations. The primary control channel is used for transmitting all the management frames including but not limited to beacon frames, probe request/response frames, association request/response frames, deauthentication frames, disassociation frames, SPSP frames, etc. in some embodiments. The primary channel can be a core frequency segment for the BSS or AP in some embodiments. The secondary channels/sub-band channels (SCs) include the neighboring channels of the primary channel.

It should be noted that certain passages of this disclosure can reference terms such as "first" and "second" in connection with subsets of frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., STAs, APs, beam formers and/or beam formees) that can operate within a system or environment. It should be understood that the systems described above can provide multiple ones of any or each of those components and these components can be provided on either a standalone machine or, in some embodiments, on multiple machines in a distributed system. Further still, bit field positions can be changed and multibit words can be used. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C #, or in any byte code language such as JAVA. The software programs or executable instructions can be stored on or in one or more articles of manufacture as object code. Circuitry may refer to any electronic circuits or circuits.

While the foregoing written description of the methods and systems enables one of ordinary skill to make and use embodiments thereof, those of ordinary skill will understand and appreciate the existence of variations, combinations, and equivalents of the specific embodiment, method, and examples herein. For example, specific values for bandwidths, channels and sub bands discussed above are exemplary. The present methods and systems should therefore not be limited by the above described embodiments, methods, and examples, but by all embodiments and methods within the scope and spirit of the disclosure.

What is claimed is:

1. A device, comprising:
a circuit configured to provide at least one encrypted frame after a secure connection is established, the at least one encrypted frame comprising data indicating a data pause resume request or a data on indication, wherein the at least one encrypted frame is a secure power save protocol frame, wherein the data is an action code for the data pause resume request or the data on indication.

2. The device of claim 1, wherein the at least one encrypted frame is provided according to an 802.11 protocol and the secure connection is established by using an association or authentication operation.

3. The device of claim 1, wherein the data pause resume request indicates a periodic sleep mode.

4. The device of claim 1, wherein the at least one encrypted frame comprises a field for the data indicating the data pause resume request, and a field for the data indicating the data on indication.

5. The device of claim 4, wherein the field for the data indicating the data pause resume request comprises data indicating a time period for a sleep mode.

6. The device of claim 4, wherein the field for the data indicating the data pause resume request comprises data indicating a periodic time period for a sleep mode.

7. The device of claim 1, wherein the data on indication indicates a length of time for providing data or a stay on until data complete indication.

8. The device of claim 1, wherein the data indicating the data pause resume request indicates a time period for a sleep mode or a periodic time period for the sleep mode.

9. The device of claim 1, wherein the device comprises a station or an access point.

10. A device, comprising:
a circuit configured to provide at least one encrypted frame, the at least one encrypted frame comprising data indicating a request to pause a data communication or data indicating a request to resume the data communication after a time period, wherein the at least one encrypted frame comprises a secure power save protocol frame, wherein the data is an action code for the request to resume the data communication or the request to pause the data communication.

11. The device of claim 10, wherein the data indicating a request to pause a data communication indicates an amount for a time period for providing a data communication before entering a sleep mode.

12. The device of claim 10, wherein the circuit is configured to receive a data on indication.

13. The device of claim 12, wherein the device is configured to receive a frame indicating that the data communication is completed.

14. The device of claim 10, wherein the at least one encrypted frame comprises a two byte field for indicating an amount for the time period.

15. The device of claim 10, wherein the data indicating the request to pause a data communication comprises an indication of a time period for a sleep mode or a periodic time period for the sleep mode.

16. A method, comprising:
establishing a secure connection between a first device and a second device; and
providing at least one encrypted frame comprising data indicating a data pause resume request or a data on indication on the secure connection, wherein the at least one encrypted frame is a secure power save protocol frame, wherein the data comprises an action code for the data pause resume request or the data on indication.

17. The method of claim 16, wherein the at least one encrypted frame is provided according to an 802.11 protocol.

18. The method of claim 16, wherein the data on indication indicates a periodic sleep mode.

19. The method of claim 16, wherein the at least one encrypted frame comprising a field for the data indicating the data pause resume request, and a field for the data indicating the data on indication.

20. The method of claim 19, wherein the field for the data indicating the data pause resume request comprises the data indicating a time period for a sleep mode.

* * * * *